(No Model.)
E. A. COCHRAN.
SHEARING CLIPPERS.
No. 508,165. Patented Nov. 7, 1893.
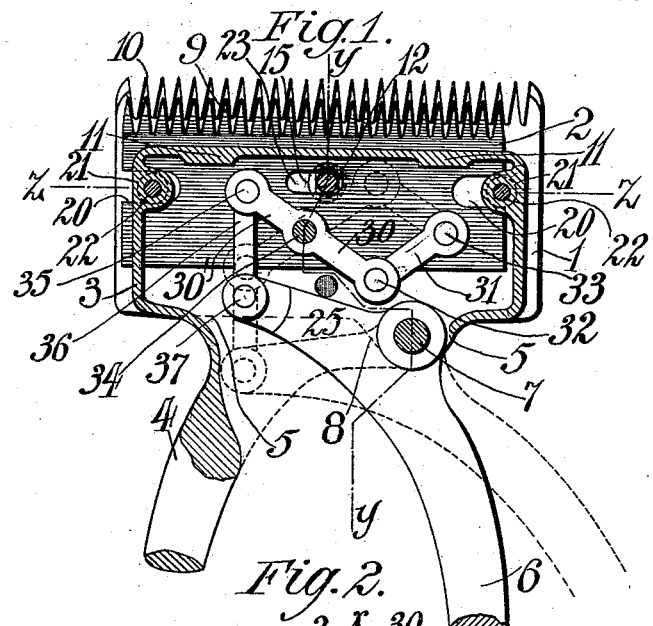
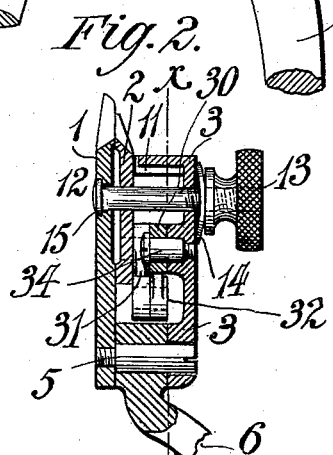
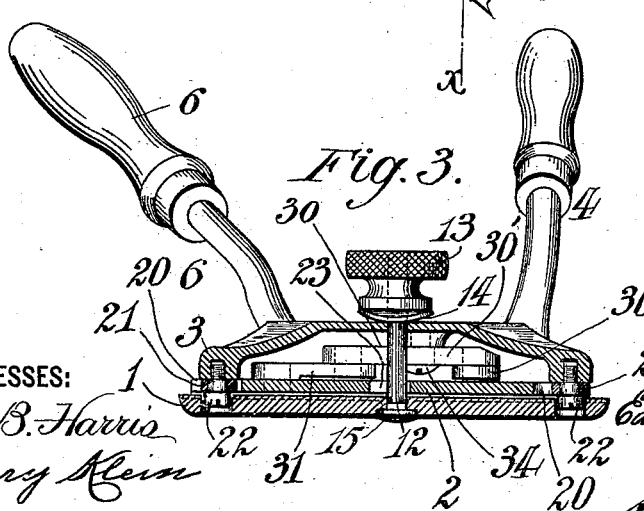
WITNESSES:
M. B. Harris
Henry Klein
INVENTOR
Edward A. Cochran
BY
Henry F. Parker
ATTORNEY
THE NATIONAL LITHOGRAPHING COMPANY,
WASHINGTON, D. C.

UNITED STATES PATENT OFFICE.

EDWARD A. COCHRAN, OF BROOKLYN, NEW YORK.

SHEARING-CLIPPERS.

SPECIFICATION forming part of Letters Patent No. 508,165, dated November 7, 1893.

Application filed January 11, 1893. Serial No. 458,014. (No model.)

*To all whom it may concern:*

Be it known that I, EDWARD A. COCHRAN, a citizen of the United States, residing at Brooklyn, in the county of Kings and State of New York, have invented certain new and useful Improvements in Shearing-Clippers, of which the following is a specification.

This invention is applicable to clippers used in shearing or clipping human or animal hair, or wool.

The invention relates to clippers, wherein the cutter-plate is reciprocated from one extremity of its stroke to the other, and back again, by each single motion of the movable handle, as described in my separate patent application, filed October 10, 1892, Serial No. 448,309; the object of thus doubly reciprocating the cutter-plate at each stroke of the movable handle being to multiply the cutting capacity of the tool without requiring any more rapid or increased range of movement of the hands in operating the clipper than heretofore.

My present invention consists in certain novel features of construction, and improvement in the operating mechanism of the tool, adapted for concentrating and simplifying the parts to the minimum; and, in order to enable others skilled in the art to which my invention appertains to understand and use the same, I will proceed to describe the details of its construction, explain its operation, and point out in the appended claim its novel characteristics.

Referring to the accompanying drawings: Figure 1, is an elevation of the instrument with the cap-plate partly removed in section on the line $x$—$x$, Fig. 2. Fig. 2, is a side view taken partly in section on the line $y$—$y$, Fig. 1. Fig. 3, is a transverse section taken on a line $z$—$z$, Fig. 1.

The housing 3, is made integral with the stationary handle 4, and an opening 5, is provided at the back of the housing 3, for the reception of the movable handle 6, which is pivoted on the stud 7, fastened in the comb-plate 1. The cutter-plate 2, is reciprocated back and forth to such an extent that its teeth 9, pass two interspaces of the teeth 10, upon the comb-plate 1, at each direction of motion, and the teeth 9, 10, shear together in the usual manner. The housing 3 is provided with projections 11, that bear against the cutter-plate 2, with elastic pressure, exerted through the agency of the clamping stud 12, clamping nut 13, and warped spring washer 14, interposed between said clamping nut and the top surface of the housing 3. The stud 12, is provided with a round head 15, for holding it in the comb-plate 1, and the flanges of the head 15, are filed off, or flattened at opposite sides, as seen in Fig. 2, and as indicated by dotted lines in Fig. 1, so as to prevent the said stud from turning in the plate 1, when the nut 13, is adjusted.

The cutter-plate 2, is provided with slots 20, whereby it is guided upon the anti-friction rollers 21, mounted on the screws 22, secured into the housing 3, and the heads of said screws project into the comb-plate 1, and serve to prevent its lateral displacement.

A suitable slot 23, is provided in the cutter-plate 2, to allow the free passage of the latter about the stud 12.

The movable handle 6, is provided with a projecting arm 25, to the extremity of which the mechanism for doubly reciprocating the cutter 2, at each motion of said handle 6, is connected.

The reciprocating mechanism consists in the toggle bars 30, 31, which are pivoted together at their adjoining ends, and its outer end, the bar 31, is pivoted at 33, to the cutter-plate 2, while the bar 30, is pivoted at 34, to the housing 3, as more clearly seen in Fig. 3. The outer extremity 30', of the toggle bar 30, receives a link 36, pivoted thereto at 35, and connected with the extremity 37, of the arm 25, pertaining to the movable handle 6.

When the movable handle 6, is moved to its position nearest the stationary handle 4, as illustrated in Fig. 1, the toggle bars 30, 31, occupy one extreme angular position, so that the cutter-plate is moved to the extreme in one direction of its stroke, and when the movable handle 6, is moved to an intermediate position, the toggle bars, 30, 31, are in a straight line, bringing the cutter-plate 2, to the extreme in the other direction of its stroke, and when the movable handle 6, has continued its motion to that position most distant from the stationary handle 4, the toggle bars 30, 31, occupy the opposite extreme angle, as shown in dotted lines in Fig. 1, returning the cutter-plate 2, to its first position, thereby performing two motions for one motion of the handle 6. When the handle 6, is returned from the position indicated in dotted lines to that indicated in full lines in Fig. 1, the double motion of the cutter 2, is repeated in a similar manner, thus causing the shearing operations to be more rapid without increasing the rapidity or range of movement given to the handles of the implement.

The present invention is not limited to its application herein illustrated to a horse clipping machine, but may be embodied in an implement having its operating handles suitably adapted to be grasped by one hand and operated by the contraction of the fingers in a hair clipper, and the outer motions of the movable handle 6, may be effected by means of a suitable spring applied thereto, in the manner usual to hair clippers.

Having thus fully described my invention, what I claim, and desire to secure by Letters Patent, is—

In animal shears, the combination of a comb plate, a movable cutter plate thereon, means for holding the tool, a pivoted handle having a projecting arm movable in a direction at substantially right angles to the movement of the cutter plate, toggle bars pivotally jointed together at their adjacent ends, the outer end of one of said bars being pivoted to the cutter plate, the other of said bars being pivoted between its ends to the frame of the machine, and a link extending from the outer extremity of said last named bar to the projecting arm of the pivoted handle.

In testimony whereof I have hereunto set my hand this 9th day of January, 1892.

EDWARD A. COCHRAN.

Witnesses:
H. F. PARKER,
HENRY KLEIN.